March 2, 1971  R. A. RIGHTMIRE ET AL  3,567,516
ELECTRICAL ENERGY STORAGE DEVICE CONTAINING A TELLURIUM ADDITIVE
Filed March 20, 1969

INVENTORS.
ROBERT A. RIGHTMIRE,
JAMES L. BENAK &
BY JOSEPH E. METCALFE, III

John F. Jones
ATTORNEY

United States Patent Office 3,567,516
Patented Mar. 2, 1971

3,567,516
ELECTRICAL ENERGY STORAGE DEVICE CONTAINING A TELLURIUM ADDITIVE
Robert A. Rightmire, Northfield, and James L. Benak and Joseph E. Metcalfe III, Bedford Heights, Ohio, assignors to The Standard Oil Company, Cleveland, Ohio
Filed Mar. 20, 1969, Ser. No. 808,876
Int. Cl. H01m 35/02
U.S. Cl. 136—6
5 Claims

ABSTRACT OF THE DISCLOSURE

The capacity of an electrical energy storage device containing a high surface area carbon cathode, a metallic anode, and a fused salt electrolyte in contact with the electrodes, can be greatly enhanced by the addition of a tellurium compound directly to the electrolyte or to the carbon cathode. On passage of an electric current through the system, the tellurium becomes permanently bonded to the carbon of the cathode thereby forming an "active" tellurium species that manifests itself as a characteristic plateau in the discharge profile of the cell.

---

Figure 1:
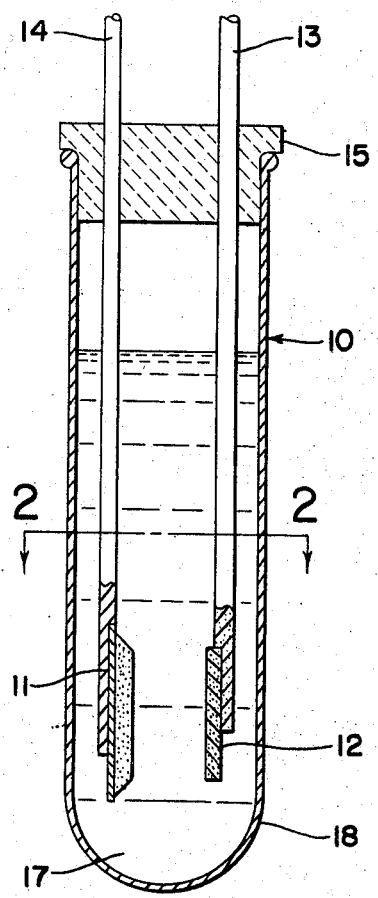

This invention relates to an electrical energy storage device and to a tellurium-containing carbon electrode suitable for use in an electrical energy storage device. More particularly, this invention relates to an electrical energy storage cell or battery containing a positive electrode comprising a high surface area, porous, carbon containing an "active," electrochemically formed tellurium species, a negative electrode and said electrodes being immersed or in contact with a fused alkali halide or alkaline earth halide electrolyte.

It has been discovered that a carbon electrode containing the "active" tellurium species functions as a reversible positive electrode with very high energy storage capacity. The energy storage capacity of a high surface area, porous carbon electrode can be virtually doubled by adding tellurium to the system in the manner described herein.

In accordance with this invention, improved cell capacity is readily obtained by the addition of a tellurium compound directly to the electrolyte or to the carbon electrode during the electrode manufacture. The tellurium species in the electrode becomes bonded to the carbon and is transformed into an "active" form upon a cyclic charge and discharge of the cell. The discharge profile of a cell containing the tellurium additive exhibits a characteristic reaction plateau at a potential of about 2.5 to 3.4 volts while in the absence of tellurium, the discharge profile of the cell slopes downwardly.

The nature of the "active" tellurium species thus formed is not definitely known. It is postulated that with the passage of electric current through the system the tellurium halide is formed at the electrode-electrolyte interface. During this time there is believed to be a bonding of the tellurium species to the carbon. Upon alternate charge and discharge of the cell the halide migrates between the cathode and the electrolyte, while the tellurium remains attached to the carbon in the cathode. It is thus possible that the "active" form may be a carbon-tellurium species halide.

The tellurium may be added to the system as any tellurium compound that is soluble in the electrolyte, stable in the environment of the cell and is compatible with the ions of the system so that metals foreign to the system will neither contaminate nor plate out on the surface of the metallic anode. Those compounds suitable for the purpose of addition include tellurium metal, tellurous and telluric halides, oxides, and acids, the tellurides and the tellurate and tellurite salts of the alkali and alkaline earth metals. Examples of these compounds include $TeCl_2$, $TeCl_4$, $TeBr_2$, $TeBr_4$, $TeI_2$, $TeI_4$, $TeF_2$, $TeF_4$, $TeO$, $TeO_2$, $TeO_3$, $K_2TeO_3$, $K_2TeO_4$, $Na_2TeO_3$, $Na_2TeO_4$, $Li_2TeO_3$, $Li_2TeO_4$, $MgTeO_3$, $MgTeO_4$, $H_2TeO_3$, $H_2TeO_4$, $K_2Te$, $Na_2Te$, $Li_2Te$, $MgTe$, and the like. The preferred compounds are those containing cations or anions that are already present in the system. Those particularly suitable are the tellurium halides and the tellurates, tellurites and tellurides of lithium and potassium.

One of the main advantages associated with the tellurium additives in this system is that tellurium can exist in either a positive or a negative valence state. The system is therefore reversible and there is little chance for loss of tellurium by being transformed into inactive, insoluble, tellurium metal during the operation of the cell. Any tellurium metal that is lost from the carbon cathode is reduced at the anode to the negative valence state, $Te^=$. The anion thus formed is soluble in the electrolyte and will again migrate from the electrolyte to the cathode where it is bonded to the carbon and can form the "active" species.

The amount of tellurium required in the system to bring about a discernible enhancement in energy storage capacity is more dependent upon the design of the cell and the rate of reaction in forming the "active" tellurium-carbon complex, than by the rate of diffusion of tellurium into the cathode. Sufficient amounts of tellurium metal should be present in the system to drive the reaction forming the "active" tellurium species to completion. However, not so great an excess of tellurium should be present so as to cause excessive leakage current. Tellurium may be added to the electrolyte or to the carbon electrode in amounts such that the condition cathode contains from 5 to 40 percent by weight, and preferably from 10 to 35 percent by weight, of tellurium metal, based on the weight of carbon.

To insure good electrical structure and full capacity of the electrical energy storage cell, easily degradable components in the structure are removed and the electrodes are permeated with electrolyte for maximum operational efficiency. This is accomplished by preconditioning the electrical energy storage cell by immersing the carbon-containing cathode assembly and the anode in the electrolyte and alternately charging and discharging at a constant predetermined voltage. This cycling converts the carbon into an unexpectedly good electron conductor or negative charge holding medium, and causes the electrochemical association of the carbon with certain constituents from the eutectic melt of the electrolyte.

The formation of the electrochemically produced "active" tellurium species in the carbon cathode may take place concurrently with the preconditioning treatment of the electrode, by cycling the cell between the voltage limits of about 1.0 to 3.4 volts. The cathode may be exposed to the tellurium-containing electrolyte melt and cycled appropriately until the carbon picks up the required amount of tellurium from the electrolyte. The electrode can continue to cycle indefinitely in the tellurium-containing electrolyte or the electrode may be removed and recycled in fresh electrolyte prior to cell assembly to minimize leakage current that may result from a large carry-over of tellurium contained in the electrolyte-filled pores of the porous carbon cathode.

In accordance with the present invention, the carbon comprising the cathode is a highly porous, high surface area, activated carbon in the form of finely divided particulate material. A broad range of carbons is suitable for this purpose. Carbons in accordance with the present invention can be prepared from activated petroleum coke, wood char, activated sodium lignosulfonate char, activated bituminous coal, polyvinylidene chloride chars, polyacrylonitrile chars and the like.

A very useful polymeric electrode material can be obtained by polymerizing a mixture of a vinyl nitrile monomer and a polyalkenyl monomer containing at least two polymerizable alkenyl groups, as more fully described in U.S. patent application Ser. No. 525,558, now U.S. Pat. No. 3,476,603.

The active carbon utilized in the preparation of the cathode has a surface area in the range of 1–2000 m.$^2$/g., and preferably in the range of 300–1500 m.$^2$/g., as measured by the Brunauer-Emmett-Teller method. The surface area is mainly internal and may be generated by activation. The pores in the activated carbon must be of sufficient size to permit electrolyte penetration.

Although some chars, as for example polyvinylidene chloride chars, are sufficiently active without subsequent activation, many of the carbons require further activation by one of numerous methods, some of which are hereinafter discussed, to impart reasonable capacity and conductivity to the carbon.

The initial stage in the preparation of an active carbon is carbonization or charring of the raw material, usually conducted in the absence of air below 600° C. Just about any carbon-containing substance can be charred. After the source material is charred, the second step is activation. The method used most extensively to increase the activity of carbonized material is controlled oxidation of a charge by suitable oxidizing gases at elevated temperatures. Most of the present commercial processes involve steam or carbon dioxide activation between 800° C. and 1000° C., or air oxidation between 300° C. and 600° C. Alternately, gases such as chlorine, sulfur dioxide and phosphorus may also be used. The time required for activation varies from 30 minutes to 24 hours, depending on the oxidizing conditions and the quality of active carbon desired. Inhibitors or accelerators can be mixed with the carbon to develop the increased activity. Other activation methods include activation with metallic chlorides and electrochemical activation. The latter is a process whereby capacity of an electrode can be increased by electrochemical cycling.

Another general method of activation is the dolomite process. Substances such as dolomite, sulphates and phosphoric acid are mixed with the carbon. On activation, the material continuously releases a uniform distribution of oxidizing gases to the carbon surface.

Some of the activated carbon is made from hard and dense material. This material is usually carbonized, crushed to size, and activated directly to give hard and dense granules of carbon. In other cases, it is advantageous to grind the charcoal, coal, or coke to a powder, form it into briquettes or pellets with a tar or pitch binder, crush to size, calcine to 500–700° C., and then activate with steam or flue gas at 850–950° C. The latter procedure gives particles with a tailor-made structure which are easier to activate because they possess more entry channels or macro pores for the oxidizing gases to enter and the reaction products to leave the center of the particles.

The tellurium may be incorporated into the carbon electrode by adding the desired tellurium compound to the activated carbon powder during the manufacture of the electrode. By adding the tellurium compound directly to the carbon prior to the molding step, a shorter preconditioning cycle is required to convert the tellurium to the "active" form than is required when tellurium is added to the electrolyte.

Tellurium may be introduced into the electrode by mixing a suitable tellurium compound, such as a tellurate or a telluride, with an activated carbon powder and binder, in the desired proportions, and the electrode is molded into the proper geometric form and heated to a temperature of about 900° C. under an inert atmosphere.

The anode may comprise any one of several different metals or metal alloys that are stable in the electrolyte melt. For example, the anode may be composed of a metal such as lithium, sodium, potassium, magnesium, bismuth, or antimony, or alloys of these metals. Lithium is particularly suitable and alloys of lithium with such metals as aluminum, indium, tin, lead, silver and copper may also be employed. Ternary lithium alloys can likewise be used. Especially preferred is an aluminum-lithium electrode which can be produced by preparing an alloy of aluminum and lithium, or, alternatively, by preconditioning or cycling a substantially pure aluminum electrode in an electrolyte containing lithium ions, during which preconditioning process lithium is diffused into the aluminum electrode structure. The former is the preferred embodiment.

The aluminum-lithium alloy of the electrode comprises aluminum in amounts of from about 70 to 95 weight percent, based on total composition, and from about 5 to 30 weight percent of lithium, based on total composition. Incidental impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode is capable of storing lithium metal of the electrolyte without forming an extensive liquid. Hence, the electrode remains solid and is capable of diffusing the lithium metal of the electrolyte through its structure. It has been found that on charge of the cell comprising the aluminum-lithium electrode, the electrode structure expands wherein lithium metal of the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

If the aluminum and lithium of the electrode are combined by preconditioning a substantially pure aluminum electrode in a fused alkali halide electrolyte, as aforementioned, the initial cycling must be done slowly. This slow preconditioning results in an electrode of substantially high uniform aluminum-lithium distribution porosity and facilitates the take-up and release of the lithium metal upon the subsequent fast charge and discharge of a cell containing the electrode. If the initial charge and discharge cycles of the preconditioning are carried out too rapidly, local regions of liquid metal alloy are built up, and the result is pitting of the aluminum-lithium electrode which has a deleterious effect when the electrodes are put into routine use. Evidence of such pitting is visually evident in the electrodes, indicating lithium agglomeration. Aluminum-lithium electrodes cycled by slow charge and discharge show a fine, even distribution of the lithium metal in the aluminum.

The electrolyte used in the device of this invention is a medium comprising a source of dissociated metal and halide ions which are mobile and free to move in the medium. Fused salt mixtures containing alkali and alkaline earth halides, as for example lithium chloride, potassium chloride, sodium chloride, calcium chloride, calcium fluoride, magnesium chloride, lithium bromide and potassium bromide, can be used. The lowest melting point media are most desirable. However, it is contemplated by the present invention that the medium be operable in the liquid state at temperatures in the range of 350–600° C.

Typical examples of materials which can be used as binary salt electrolytes include lithium chloride-potassium chloride, potassium chloride-magnesium chloride, magnesium chloride-sodium chloride, lithium bromide-potassium bromide, lithium fluoride-rubidium fluoride, magnesium chloride-rubidium chloride, lithium chloride-lithium fluoride, lithium chloride-strontium chloride, cesium chloride-sodium chloride, calcium chloride-lithium chloride, and mixtures thereof.

Examples of ternary electrolytes are calcium chloride-lithium chloride-potassium chloride, lithium chloride-potassium chloride-sodium chloride, lithium chloride-potassium chloride-magnesium chloride, calcum chloride-lithium chloride-sodium chloride, and lithium bromide-sodium bromide-lithium chloride.

The preferred electrolyte systems are those of potassium chloride-lithium chloride and lithium bromide and potassium bromide, and mixtures thereof. A lithium chloride-potassium chloride system of 41 mole percent potassium chloride and 59 mole percent lithium chloride forms a eutectic which melts at 352° C. and has a decomposition voltage of about 3.55 volts.

Since the electrical energy storage device operates at or above the fusion temperature of the electrolyte, the above-mentioned electrolytes are provided a means of heating to insure their remaining in the molten state.

The electrical energy storage units hereindescribed lend themselves to connection with units of similar construction either by connection of a number of units in series and parallel, or by utilization of a stack of electrodes.

This invention will be further illustrated by reference to the drawing in FIG. 1 wherein a schematic test cell 10 of the present invention is shown. The tellurium-containing carbon electrode 12 and metallic anode 11 are positioned one from another, in spaced relationship, immersed in an electrolyte 17 held in a heat-resistant glass tube or stainless steel tube 18. Carbon electrode 12 is fixed rigidly to a graphite current carrier 13 and the metallic anode 11 is fixed rigidly to a steel current carrier 14. The container comprising the electrolyte and electrodes is purged of atmospheric air and an inert gas is introduced into the container. The open end of the container is then sealed with a cap 15 of inert material, such as lava or ceramic.

A better understanding of the present invention can be obtained from the following examples. The examples are illustrations of specific embodiments of the invention and are not to be construed in any way as limitations of the invention. The experiments were carried out in the same type of test tube cell herein aforementioned, and shown in FIG. 1.

EXAMPLE 1

A cathode was obtained from a charcoal prepared by Pure Carbon Company. The commercial-grade carbon had the following physical properties: a total pore volume of 0.566 cm.$^3$/g., a surface area of 400 m.$^2$/g., an average density of 0.90 g./cm.$^3$, a Scleroscope hardness of 35–45, and an ash content of 10 percent. The carbon electrode contained 0.092 inch$^3$ of active carbon.

The solid aluminum-lithium anode, approximately 1.0 x 0.5 x 0.15 inch, initially contained 13 percent by weight of lithium. Both electrodes were immersed in an electrolyte containing 160 grams of a eutectic salt mixture of lithium chloride and potassium chloride. The eutectic mixture had a composition of 59 mole percent lithium chloride and 41 mole percent potassium chloride and had a melting point of 352° C. The cell assembly was contained in a stainless steel test tube with a total inside volume of 13.4 inches$^3$. An argon atmosphere was established within the cell and the cell was operated at a temperature between 450° C. and 500° C. The electrodes were conditioned in the electrolyte by cycling the cell at a constant voltage of 3.34 volts for 30 minutes and then discharging at a constant current to 1.0 volt. The cell was cycled for 20 cycles. At a constant current discharge of 200 milliamperes the cell delivered 185 watt minutes per inch$^3$ of carbon.

EXAMPLE 2

The experimental conditions of Example 1 were repeated except that 1.6 grams of potassium telluride (K$_2$Te) were added to the electrolyte in the discharge state and the cell was then cycled in the same manner as described. At a constant discharge of 200 milliamperes, the cell delivered 315 watt minutes per inch$^3$ of carbon.

Figure 2:
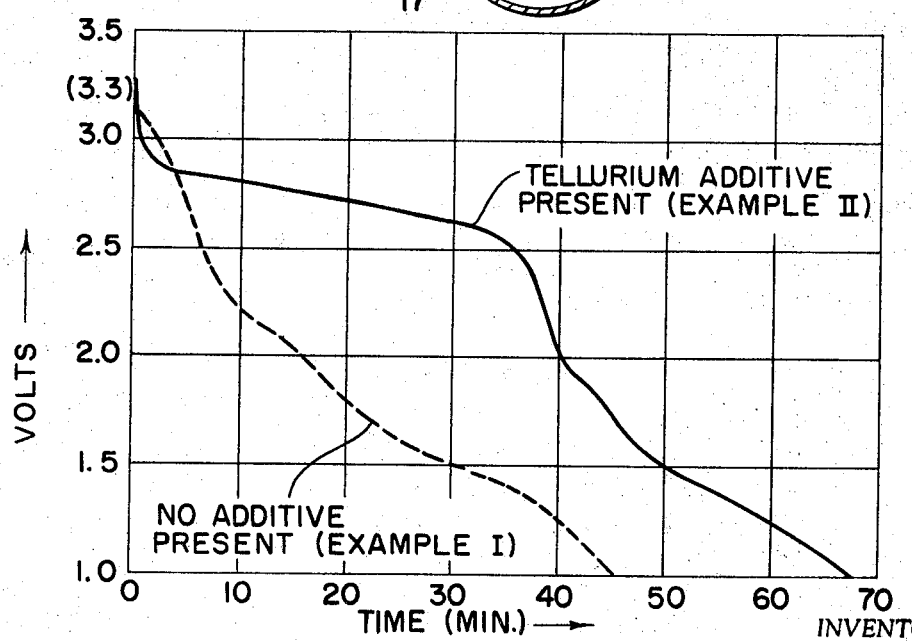

A comparison of the discharge curves obtained for the cells of Examples 1 and 2 is shown in FIG. 2. A sloping discharge profile is observed for the cell in Example 1 without the tellurium additive, whereas with the tellurium additive, in Example 2, a characteristic plateau in the discharge curve appears at a reaction potential of about 2.5 to 3.34 volts. As a result of a shift in the reaction to a higher voltage, a significant increase in watt minutes is observed for the cell containing the tellurium additive.

EXAMPLE 3

The cell and operating conditions of Example 2 were repeated except that 1.5 grams of potassium telluride (K$_2$Te) were added to the electrolyte and the carbon electrode had a volume of 0.124 inch$^3$. At a constant discharge of 400 milliamperes, the cell delivered 416 watt minutes per inch$^3$.

EXAMPLE 4

The experimental conditions of Example 2 were repeated with the exception that the cathode was preconditioned by cycling in a prototype energy storage cell, and the preconditioned electrode was then removed from the prototype cell and placed in a cell containing fresh electrolyte. The cathode contained 19.92 inches$^3$ of active carbon and had the same carbon composition as that employed in Example 1. The prototype cell contained 35 pounds of the eutectic salt mixture of lithium chloride-potassium chloride to which had been added an excess of potassium telluride. The solid aluminum-lithium anode of the auxiliary cell had the dimensions of 6$\frac{3}{32}$ x 5$\frac{27}{32}$ x 0.050 inches and the cell volume was equivalent to 44.6 inches$^3$ (total inside volume). The auxiliary cell contained 200 grams of the lithium chloride-potassium chloride eutectic salt mixture, but did not contain any potassium telluride. At a constant current discharge of 30 amperes, the auxiliary cell delivered 297 watt minutes per inch$^3$ of carbon cathode.

EXAMPLE 5

The operating conditions of Example 2 were repeated except that the molded cathode was obtained from Pittsburgh Activated Carbon Company. The density of the material as determined by Hg displacement was 0.92 g./cm.$^3$ and the electrode contained 0.101 inch$^3$ of active carbon. 1.5 grams of potassium telluride were added to the electrolyte. At a constant current discharge of 400 milliamperes, the cell delivered 502 watt minutes per inch$^3$ of carbon cathode.

EXAMPLE 6

A carbon cathode was prepared from a saran polymer resin (polyvinylidene chloride) obtained from Dow Chemical Company. The saran was charred at temperatures of up to 900–1000° C. in an argon atmosphere during a 16-hour heat-treatment cycle. The char was ground and sieved through 100/325 U.S. standard mesh screens. 30 grams of the char were blended with 12.85 grams of a phenol-formaldehyde thermosetting resin in a twin shell blender. The mixture was molded in a die at 6,000 p.s.i. and subsequently baked to 900–1000° C. in an argon atmosphere during a 16-hour heat-treatment cycle. The electrode contained 0.0625 inch$^3$ of active carbon and had a surface area (B.E.T. method) in the range of 500–1000 m.$^2$/g., an ash content of 0.2 percent, and a Hg density of 0.97 g./cc.

A cell containing the above prepared carbon cathode, a solid aluminum-lithium anode, approximately 1.75 x 0.50 x 0.15 inches, and approximately 160 grams of LiCl-KCl eutectic electrolyte was assembled in a stainless steel test tube. The saran cathode cell produced 288 watt minutes per inch$^3$ of carbon. To the cell having an open circuit potential of 1.0 volt, 10 grams of potassium tellurate (K$_2$TeO$_4$) were added to the electrolyte. The cell was cycled at a constant voltage of 3.34 volts for 20 minutes and discharged at a constant current of 300 milliamperes from a cell voltage of 3.34 to 1.0. The capacity of the cell increased over a period of 30 days to a maximum of 617 watt minutes per inch$^3$ and then leveled off.

EXAMPLE 7

The experimental conditions of Example 1 were repeated with the exception that the carbon cathode utilized was prepared as follows: 13 grams of a thermosetting, phenol-formaldehyde resin binder, 11 grams of $K_2TeO_4$, and 30 grams of a coal-derived carbon char having the physical properties Surface area—950–1050 m.$^2$/g.
Hg density—0.75 g./cc.
Helium density—2.1 g./cc.
Percent ash—8.0 percent
Pore volume—0.85 cc./g.

were blended and molded under pressure. The molded electrode was heated to 900° C. in an argon atmosphere for 16 hours. The electrode was placed in a cell as described in Example 1. The cell was charged at a constant voltage to 3.34 volts for 35 minutes. The discharge profile of the cell exhibited the characteristic tellurium complex plateau and the cell produced 540 watt minutes per inch$^3$ of carbon. The conditioned cathode had a capacity of 414 watt minutes per inch$^3$ of carbon.

We claim:
1. An electrical energy storage device comprising in combination:
   (A) an electrolyte comprising a salt selected from the group consisting of an alkali metal halide, an alkaline earth metal halide, and mixtures thereof;
   (B) a negative electrode in contact with said electrolyte; and
   (C) a positive electrode composed essentially of an activated carbon and an electrochemically formed tellurium carbon complex also in contact with said electrolyte; said device being operable at a temperature at which the electrolyte is in a molten condition.
2. The electrical energy storage device of claim 1 wherein the positive electrode contains from about 5 to 40 percent by weight of tellurium based on the weight of the carbon.
3. The electrical energy storage device of claim 1 wherein the negative electrode (B) is composed essentially of an alloy of lithium and aluminum.
4. The electrical energy storage device of claim 3 wherein the electrolyte comprises a lithium halide-containing salt.
5. The electrical energy storage device of claim 4 wherein the electrolyte consists essentially of a eutectic mixture of lithium chloride and potassium chloride and the negative electrode is composed of an alloy having the composition 70 to 95 weight percent aluminum and 5 to 30 weight percent lithium.

References Cited
UNITED STATES PATENTS

| | | | |
|---|---|---|---|
| 2,081,926 | 6/1937 | Gyuris | 136—83.1 |
| 3,036,144 | 5/1962 | Lehovec et al. | 136—153 |
| 3,096,218 | 7/1963 | Lieb et al. | 136—121 |
| 3,445,288 | 5/1969 | Buzzelli | 136—6 |

DONALD L. WALTON, Primary Examiner

C. F. LE FEVOUR, Assistant Examiner

U.S. Cl. X.R.
136—83